US010069696B2

(12) United States Patent
Liang et al.

(10) Patent No.: US 10,069,696 B2
(45) Date of Patent: Sep. 4, 2018

(54) DATA ACQUISITION METHOD AND APPARATUS FOR DRIVERLESS VEHICLE

(71) Applicant: BEIJING BAIDU NETCOM SCIENCE AND TECHNOLOGY CO., LTD., Beijing (CN)

(72) Inventors: Yibing Liang, Beijing (CN); Bocong Liu, Beijing (CN); Zhuo Chen, Beijing (CN); Wei He, Beijing (CN); Chengliang Deng, Beijing (CN); Kaiwen Feng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 108 days.

(21) Appl. No.: 15/410,614

(22) Filed: Jan. 19, 2017

(65) Prior Publication Data
US 2018/0077034 A1  Mar. 15, 2018

(30) Foreign Application Priority Data
Sep. 13, 2016 (CN) .......................... 2016 1 0821932

(51) Int. Cl.
| H04J 3/06 | (2006.01) |
| H04L 12/26 | (2006.01) |
| H04J 3/14 | (2006.01) |
| H04L 12/725 | (2013.01) |
| H04L 29/08 | (2006.01) |

(Continued)

(52) U.S. Cl.
CPC ............ *H04L 43/04* (2013.01); *H04J 3/0661* (2013.01); *H04J 3/14* (2013.01); *H04L 43/106* (2013.01); *H04L 45/3065* (2013.01); *H04L 67/2842* (2013.01); *H04Q 9/00* (2013.01); *H04W 4/44* (2018.02); *H04L 67/12* (2013.01)

(58) Field of Classification Search
CPC ..................................................... H04L 43/04
See application file for complete search history.

(56) References Cited

U.S. PATENT DOCUMENTS 9,376,117 B1 * 6/2016 Parundekar .......... B60W 50/087
9,523,986 B1 * 12/2016 Abebe ....................... G08G 5/00
9,618,940 B1 * 4/2017 Michini ................. G05D 1/101
(Continued)

*Primary Examiner* — Gerald A Smarth
(74) *Attorney, Agent, or Firm* — Lathrop Gage LLP

(57) ABSTRACT

The present application discloses a data acquisition method and apparatus for a driverless vehicle. A specific implementation of the method comprises: selecting a sensor having the highest importance level among at least one sensor of the driverless vehicle as a first sensor and at least one sensor other than the first sensor to form a second sensor set; acquiring a start time of a current time window, and executing the following data processing steps: executing real-time acquiring and storing operations on data packets collected by each sensor among the at least one sensor after the start time of the current time window; determining whether any condition in the following condition group is met; and in response to determining that any condition in the condition group is met, setting the start time of the current time window to the current time, and continuing executing the data processing steps. This implementation realizes synchronized storage of the data packets collected by the at least one sensor of the driverless vehicle.

11 Claims, 7 Drawing Sheets

(51) Int. Cl.
*H04Q 9/00* (2006.01)
*H04W 4/44* (2018.01)

(56) References Cited

U.S. PATENT DOCUMENTS

| | | | |
|---|---|---|---|
| 2006/0202863 A1* | 9/2006 | Kavaler | G08G 1/0104 340/941 |
| 2007/0040365 A1* | 2/2007 | Asada | B60R 21/0132 280/735 |
| 2010/0063663 A1* | 3/2010 | Tolstedt | G05D 1/0231 701/23 |
| 2016/0370338 A1* | 12/2016 | Sayfan | G01N 33/0062 |
| 2017/0086054 A1* | 3/2017 | Azevedo | H04W 4/02 |
| 2017/0086241 A1* | 3/2017 | Lopes | H04W 76/025 |

* cited by examiner

DATA ACQUISITION METHOD AND APPARATUS FOR DRIVERLESS VEHICLE

CROSS REFERENCE TO RELATED APPLICATIONS

This application claims the priority of Chinese Patent Application No. 201610821932.1, entitled "Data Acquisition Method and Apparatus for Driverless Vehicle," filed on Sep. 13, 2016, the content of which is incorporated herein by reference in its entirety.

TECHNICAL FIELD

The present application relates to the field of motor vehicle technology, in particular to the field of driverless vehicle technology, and more particularly, to a data acquisition method and apparatus for a driverless vehicle.

BACKGROUND

The control system of a driverless vehicle relies on sensors to sense the surrounding environment by means of a sensor. In order to obtain more comprehensive information, the driverless vehicle is usually equipped with a variety of sensor devices. Different sensor devices may be complementary to each other, for providing more comprehensive information to the control system of the driverless vehicle. Types of the sensors usually configured in the driverless vehicle comprise a LIDAR sensor, a camera sensor, a GPS (Global Positioning System), etc.

The variety of sensors can provide the control system of the driverless vehicle with more comprehensive information, but also bring certain complexity. Data from different sensors need to undergo a multi-aspect and multi-level merge process including synchronization, correlation, combination, and the like, to reduce redundant information, and to improve the environment identification accuracy of the control system. In the prior art, the data collected by a plurality of LIDAR sensors is aligningly stored by means of a time synchronizer, and when time stamps of point cloud output data of the plurality of LIDAR sensors are the same, the data is combined and output.

However, the existing driverless vehicle is often equipped with different types of sensors, different types of sensors have different coverage ranges and work cycles, and the manner of using the time synchronizer may cause information losses and timing errors, so that there may be a problem that the data alignment of multiple types of sensors is not supported.

SUMMARY

An objective of the present application is to propose a data acquisition method and apparatus for a driverless vehicle, for solving the technical problem mentioned in the foregoing Background section.

In the first aspect, the present application provides a data acquisition method for a driverless vehicle, wherein the method comprises: acquiring sensor information from each sensor among at least one sensor of the driverless vehicle, the sensor information comprising: an importance level, a collection period, and a number of data packets required to be collected per collection period; selecting a sensor having a highest importance level among the at least one sensor as a first sensor; selecting at least one sensor other than the first sensor from the at least one sensor based on the importance level of the sensor to form a second sensor set; acquiring a start time of a current time window, and executing following data processing steps: executing real-time acquiring and storing operations on data packets collected by each sensor among the at least one sensor after the start time of the current time window; determining whether any condition in a following condition group is met: a collection period of the first sensor has elapsed from the start time of the current time window to a current time; a number of acquired and stored data packets collected by the first sensor has reached the number of data packets required to be collected per collection period of the first sensor, and a number of the acquired and stored data packets collected by each sensor in the second sensor set has reached the number of data packets required to be collected per collection period of the sensor; and setting the start time of the current time window to the current time in response to determining that any condition in the condition group is met, and continuing executing the data processing steps.

In some embodiments, the executing the real-time acquiring and storing operations on the data packets collected by each sensor in the at least one sensor after the start time of the current time window comprises: acquiring in real time the data packets collected by each sensor in the at least one sensor after the start time of the current time window and storing the acquired data packets into a cache indicated by a cache address corresponding to the current time window, and the method further comprises, after the setting the start time of the current time window as the current time: setting a corresponding cache address for the current time window.

In some embodiments, the selecting the at least one sensor other than the first sensor from the at least one sensor based on the importance level of the sensor to form the second sensor set comprises: ranking the at least one sensor based on the importance level, and selecting a predetermined number of sensors other than the first sensor from the at least one sensor according to an order from high to low of importance levels to form a second sensor set.

In some embodiments, the data packets are data packets with time stamps.

In some embodiments, the importance level of the sensor is preset based on a type of the sensor and position information of the sensor in the driverless vehicle.

In a second aspect, the present application provides a data acquisition apparatus for a driverless vehicle, wherein the apparatus comprises: an acquisition unit, configured to acquire sensor information from each sensor among at least one sensor of the driverless vehicle, the sensor information comprising: an importance level, a collection period, and a number of data packets required to be collected per collection period; a first selection unit, configured to select a sensor having a highest importance level among the at least one sensor as a first sensor; a second selection unit, configured to select at least one sensor other than the first sensor from the at least one sensor based on the importance level of the sensor to form a second sensor set; a first execution unit, configured to acquire a start time of a current time window and execute following data processing steps: executing real-time acquiring and storing operations on data packets collected by each sensor in the at least one sensor after the start time of the current time window; and determining whether any condition in a following condition group is met: a collection period of the first sensor has elapsed from the start time of the current time window to a current time; a number of acquired and stored data packets collected by the first sensor has reached the number of data packets required to be collected per collection period of the first sensor, and a number of the acquired and stored data packets collected by each sensor in the second sensor set has reached the number of data packets required to be collected per collection period of the sensor; and a second execution unit, configured to set the start time of the current time window to the current time in response to determining that any condition in the condition group is met, and continue executing the data processing steps.

In some embodiments, the first execution unit is further configured to: acquire in real time the data packets collected by each sensor in the at least one sensor after the start time of the current time window and store the acquired data packets into a cache indicated by a cache address corresponding to the current time window; and the second execution unit is further configured to: set a corresponding cache address for the current time window.

In some embodiments, the second selection unit is further configured to: rank the at least one sensor based on the importance level, and select a predetermined number of sensors other than the first sensor from the at least one sensor according to an order from high to low of importance levels to form a second sensor set.

In some embodiments, the data packets are data packets with time stamps.

In some embodiments, the importance level of the sensor is preset based on a type of the sensor and position information of the sensor in the driverless vehicle.

The data acquisition method and apparatus for a driverless vehicle provided in the present application, by acquiring sensor information from each sensor among at least one sensor of the driverless vehicle, then selecting a sensor having the highest importance level among the at least one sensor as a first sensor, then selecting at least one sensor that does not comprise the first sensor from the at least one sensor to form a second sensor set; acquiring a start time of a current time window, and executing the following data processing steps: executing real-time acquiring and storing operations on data packets collected by each sensor in the at least one sensor after the start time of the current time window; determining whether any condition in the following condition group is met; and after determining the any condition in the condition group is met, setting the start time of the current time window to the current time, and continuing executing the data processing steps, implements aligned storage of the data packets collected by the at least one sensor of the driverless vehicle.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
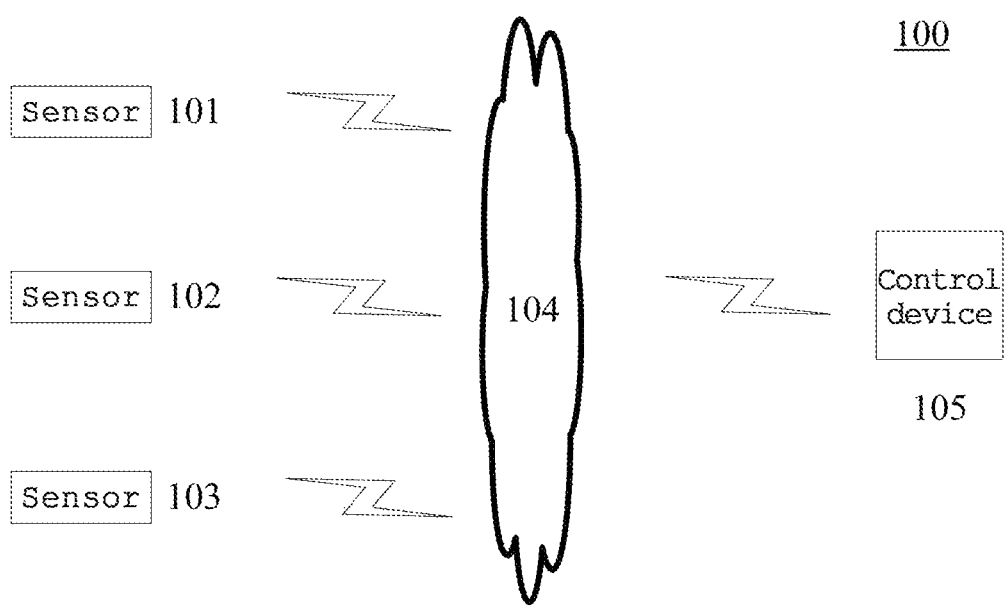
FIG. 1 is a diagram showing an exemplary system architecture in which the present application can be applied.

FIG. 1 shows an exemplary system architecture 100 in which a data acquisition method for a driverless vehicle or a data acquisition apparatus for a driverless vehicle of an embodiment of the present application may be implemented.

As shown in FIG. 1, the system architecture 100 may comprise sensors 101, 102, and 103, a network 104, and a control device 105. The network 104 servers as a medium providing a communication link between the sensors 101, 102, and 103 and the control device 105. The network 104 may comprise various types of connections, such as wired and wireless communication links, a bus, a cable, or a fiber-optic cable. The sensors 101, 102, and 103 may comprise a LIDAR sensor, a camera sensor, a GPS, etc. Different sensors may interact with the control device 105 in different ways. For example, the LIDAR sensor may transmit data to the control device 105 through a cable, and the camera sensor may send collected image data to a bus of a vehicle, and the control device 105 may acquire the image data from the bus of the vehicle.

The sensors 101, 102, and 103 interact with the control device 105 through the network 104, for receiving or sending messages, or the like. For example, the control device 105 may send a control instruction to the sensors 101, 102, and 103 through the network 104, and the sensors 101, 102, and 103 may send the data collected respectively to the control device 105 through the network 104. A variety of applications, such as sensor data acquiring applications, sensor data processing applications, and driverless vehicle control applications, may be installed on the control device 105.

It should be noted that, the data acquisition method for a driverless vehicle provided by the embodiments of the present application is generally performed by the control device 105, and accordingly, the data acquisition apparatus for a driverless vehicle is generally provided in the control device 105.

It should be understood that, the numbers of the sensors, the networks, and the control devices in FIG. 1 are merely illustrative. Any number of sensors, networks, and control devices may be provided based on the actual requirements.

Figure 2:
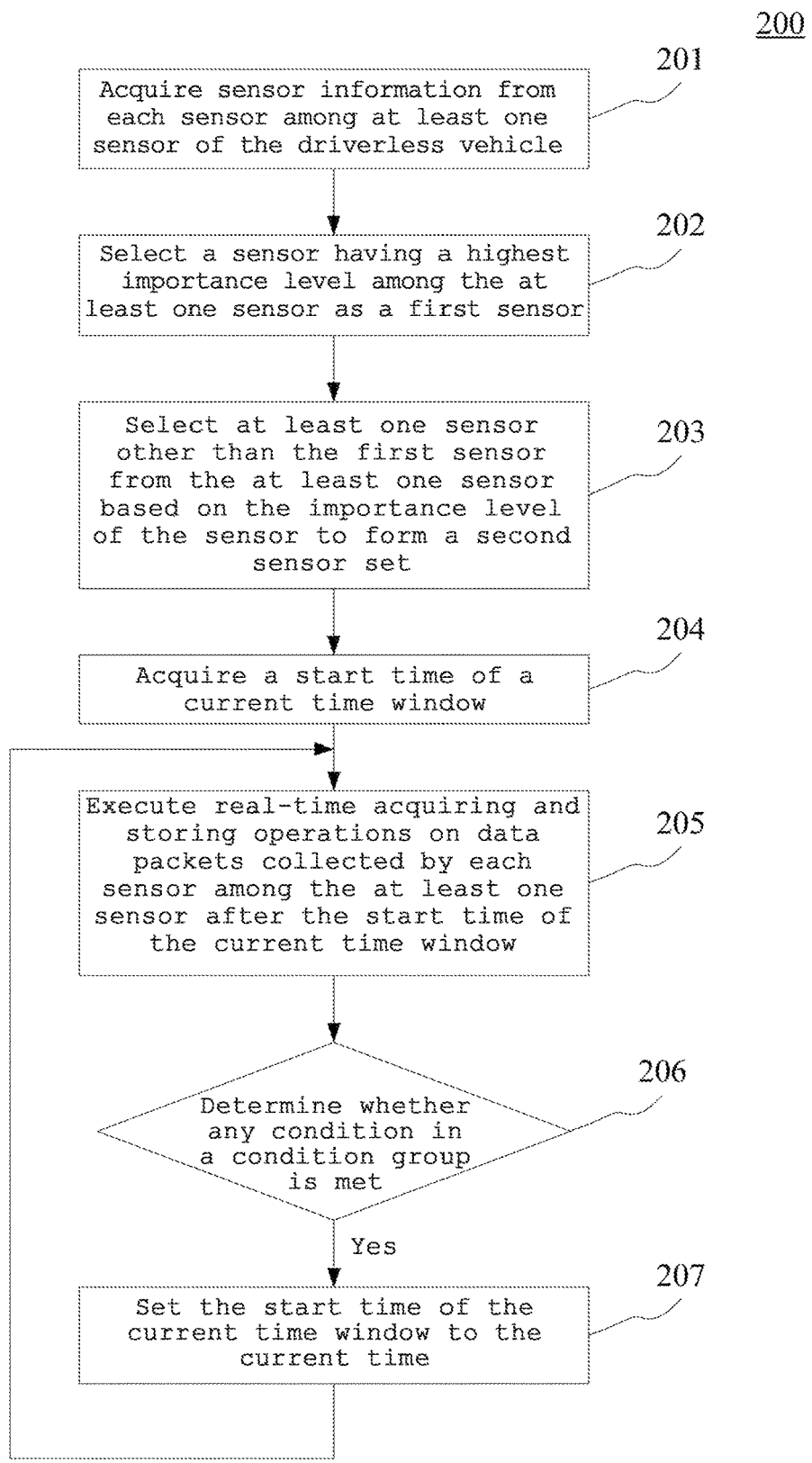
FIG. 2 is a flowchart of an embodiment of a data acquisition method for a driverless vehicle according to the present application.

Further referring to FIG. 2, it is a procedure 200 of an embodiment of a data acquisition method for a driverless vehicle according to the present application. The data acquisition method for a driverless vehicle comprises the following steps:

Step 201, acquire sensor information from each sensor among at least one sensor of a driverless vehicle.

In this embodiment, the sensor information from each sensor among the at least one sensor of the driverless vehicle may be locally stored in an electronic device (for example, the control device shown in FIG. 1) on which the data acquisition method for the driverless vehicle is operated, such that the above-mentioned electronic device is capable of locally acquiring the sensor information from each sensor among the at least one sensor set in the driverless vehicle in which the electronic device is located. The sensor information from each sensor among the at least one sensor of the driverless vehicle may also be stored on a cloud server (not shown in the figure) providing support to the driverless vehicle, so that the above-mentioned electronic device is capable of acquiring the sensor information from each sensor among the at least one sensor of the driverless vehicle from the cloud server remotely.

In this embodiment, the sensor information may comprise: an importance level, a collection period, and the number of data packets required to be collected per collection period.

In this embodiment, the importance level may be preset for each sensor of the driverless vehicle. The importance level represents the importance of the role that the sensor plays in the control system of the driverless vehicle. For example, a LIDAR sensor plays a more important role in the control system of the driverless vehicle, a higher importance level may be set for the LIDAR sensor. The importance level may be represented in various ways. As an example, the importance levels may be represented by numbers, for example, the importance levels comprises: five levels including "1", "2", "3", "4", and "5", wherein "1" is the lowest level, and "5" is the highest level; the importance levels may also be represented by characters, for example, the importance levels may comprise: five levels including "A", "B", "C", "D", and "E", wherein "A" is the lowest level, and "E" is the highest level; the importance levels may also be represented by texts, for example, the importance levels may comprise: five levels including "the most important", "very important", "important", "normal", and "not important", wherein "the most important" is the highest level, and "not important" is the lowest level.

In some optional implementations of this embodiment, the importance level of the sensor may be preset based on the type of the sensor and the position information of the sensor in the driverless vehicle. For example, a higher importance level may be set for a LIDAR sensor since the LIDAR sensor plays an important role in the driverless vehicle, and different importance levels may also be set for different LIDAR sensors based on different positions and scanning ranges of the LIDAR sensors in the driverless vehicle. For example, the LIDAR sensor positioned on the top of the driverless vehicle, due to its large scanning range, may be set to the highest importance level.

In this embodiment, a collection period may be preset for each sensor of the driverless vehicle. The collection period represents the time needed for the sensor to collect data once. The collection period of the sensor may be preset based on hardware parameters of the sensor. For example, if the time for a LIDAR sensor to turn a turn is 100 ms, 100 ms is the collection period of the LIDAR sensor; and if a camera sensor takes a photo every 50 ms, 50 ms is the collection period of the camera sensor.

In this embodiment, the number of data packets required to be collected per collection period may be preset for each sensor of the driverless vehicle. The number of data packets required to be collected per collection period is the number of data packets that can be normally collected by the sensor in each collection period. The number of data packets required to be collected per collection period may be preset based on hardware parameters of the sensor. For example, for a 64-line LIDAR sensor, each line of the LIDAR sensor is capable of collecting 6 data packets in each collection period in normal cases, so that the 64 lines of the LIDAR sensor should normally collect 64*6=384 data packets per collection period, and thus 384 is the number of data packets required to be collected per collection period of the 64-line LIDAR sensor.

Step 202, select a sensor having the highest importance level from the at least one sensor driverless as a first sensor.

In this embodiment, the above-mentioned electronic device may select a sensor having the highest importance level among at least one sensor as a first sensor after acquiring sensor information from sensors of the driverless vehicle.

Step 203, select at least one sensor not comprising the first sensor from the at least one sensor based on the importance level of the sensor to form a second sensor set.

In this embodiment, the electronic device may select at least one sensor that does not comprise the first sensor from the at least one sensor based on the importance level of the sensor to form the second sensor set.

In some optional implementations of this embodiment, the at least one sensor may be ranked based on the importance level, and a predetermined number of sensors that do not comprise the first sensor are selected from the at least one sensor according to an order from high to low of importance levels to form the second sensor set.

In some optional implementations of this embodiment, all sensors having the importance level one level lower than the importance level of the first sensor may also be selected from the at least one sensor to form the second sensor set.

In some optional implementations of this embodiment, a first predetermined number of sensors having the importance level one level lower than the importance level of the first sensor may also be selected from the at least one sensor to form the second sensor set.

Step 204, acquire a start time of a current time window.

In this embodiment, the time window comprises a start time and an end time, and the difference between the end time and the start time of the time window is the window length of the time window. Here, acquiring the start time of the current time window may refer to, when the driverless vehicle converts from a stop state or an engine off state into a driving state, acquiring the current time as the start time of the current time window, and after the start time of the current time window is acquired, the electronic device may turn to Step 205 for acquiring and storing in real time data packets collected by each sensor in the at least one sensor of the driverless vehicle after the start time of the current time window. In the process of performing the real-time acquiring and storing operations on the data packets collected by each sensor in the at least one sensor at Step 205, only one current time window is provided at the same time. After the current time window starts, the procedure proceeds to Step 205 to execute the real-time acquiring and storing operations, and determines whether the condition for ending the current time window is met at Step 206, and if yes, proceeds to Step 207 to end the current time window and enter a next time window, wherein the start time of the next time window is the end time of the last time window, and re-executes Step 205 by using the next time window as the current time window.

In some optional implementations of this embodiment, the above-mentioned electronic device may acquire a current time provided by an operating system thereof as the start time of the current time window.

In some optional implementations of this embodiment, the above-mentioned electronic device may also acquire, from a cloud server providing a time service, a current time provided by the cloud server as the start time of the current time window.

In some optional implementations of this embodiment, the electronic device may acquire, from a GPS installed on the driverless vehicle, a current time provided by the GPS as the start time of the current time window.

Step 205, execute the real-time acquiring and storing operations on the data packets collected by each sensor in the at least one sensor after the start time of the current time window.

In this embodiment, the above-mentioned electronic device may execute the real-time acquiring and storing operations on the data packets collected by each sensor in the at least one sensor after the start time of the current time window.

In some optional implementations of this embodiment, the above-mentioned electronic device may acquire in real time the data packets collected by each sensor in the at least one sensor after the start time of the current time window and store the acquired data packets into a cache indicated by a cache address corresponding to the current time window. Here, the cache address corresponding to the current time window may be a corresponding cache address set for the current time window after the start time of the current time window is set to the current time at Step 207 and before the procedure proceeds to Step 205. Based on the above-mentioned operations, the data packets collected by the at least one sensor within one time window are stored into a cache indicated by one cache address, and the data packets collected by the at least one sensor within different time windows are stored into caches indicated by the cache addresses corresponding to different time windows, such that the aligned storage of the data packets collected by the at least one sensor is realized.

In some optional implementations of this embodiment, the data packets collected by the sensor may be data packets with time stamps. The data content contained in the data packet may be sensed data generated by the sensor (for example, for the LIDAR sensor, the sensed data may be position information and reflection value intensity information of an object scanned by the LIDAR sensor, and for the camera sensor, the sensed data may be image information of the surrounding environment of the driverless vehicle), and the time stamp indicates the time when the data packet is generated (that is the time when the sensor collects the data packet).

Step 206, determine whether any condition in a condition group is met, and if yes, proceed to Step 207.

In this embodiment, the above-mentioned electronic device may determine in real time whether any condition in the condition group is met in the process of executing the real-time acquiring and storing operations on the data packets collected by each sensor in the at least one sensor after the start time of the current time window, and if yes, the procedure proceeds to Step 207. Here, the condition group may comprise: a collection period of the first sensor has elapsed from the start time of the current time window to a current time; the number of the acquired and stored data packets collected by the first sensor has reached the number of data packets required to be collected per collection period of the first sensor, and the number of the acquired and stored data packets collected by each sensor in the second sensor set has reached the number of data packets required to be collected per collection period of the sensor.

Step 207, set the start time of the current time window to the current time, and proceed to Step 205 to continue.

In this embodiment, when it is determined that any condition in the condition group is met, the above-mentioned electronic device may set the start time of the current time window to the current time (that is, the previous time window ends, and the next time window starts), and the procedure turns to Step 205 to continue.

In some optional implementations of this embodiment, the above-mentioned electronic device may also set a corresponding cache address for the current time window after setting the start time of the current time window to the current time and before proceeding to Step 205. That is, the previous time window has ended, and the cache address of the current time window may be different from the cache address of the previous time window; therefore, it is necessary to set a new cache address for the current time window, so as to determine to store the data packets collected by each sensor in the at least one sensor after the start time of the current time window into the cache indicated by the cache address corresponding to the current time window after the current time window starts.

It should be noted that, if the driverless vehicle is in a driving state, the data processing step from Step 205 to Step 207 may be ongoing, aiming at providing information for the control system of the driverless vehicle via the data packets collected by the at least one sensor, so as to enable the control system of the driverless vehicle to generate a control instruction for controlling the driving of the vehicle. If the driverless vehicle is in a stop state or an engine off state, the data processing steps from Step 205 to Step 207 may stop. When the driverless vehicle is in the driving state again, the procedure may be re-executed from Step 201.

In some optional implementations of this embodiment, a Robot Operating System (ROS) may be installed in the control device of the above-mentioned driverless vehicle. The ROS may be formed by many nodes and topics, and each node may be a separate process. The nodes can be classified into two types: a sending node and a receiving node, wherein the sending node may be configured to send the collected data, and the receiving node may be configured to receive the data sent by the sending node (sometimes a node may be the sending node and the receiving node at the same time). The topics are the basis for establishing a connection between the nodes. After a connection is established between the nodes, the sending node and the receiving node may implement data transmission through a shared memory. In addition, for transmitting data of different topics, different shared memories may be used. The above-mentioned data acquisition method for the driverless vehicle may be used for a sending node in the ROS, which, according to the above-mentioned data acquisition method for the driverless vehicle, aligns the data packets collected by the at least one sensor on the driverless vehicle and stores them in a shared memory serving as a transmission medium between the sending node and the receiving node, and after the current time window of the sending node ends, may send a message to the receiving node, indicating that the data packets collected by the at least one sensor have been stored aligningly, such that the receiving node may acquire the data packets collected by the at least one sensor that are stored aligningly from the shared memory serving as the transmission medium between the sending node and the receiving node, and the receiving node may process the acquired data packets accordingly to generate a control instruction for controlling the driverless vehicle. That is, the sending node and the receiving node together implement fusing the data for sensing the external environment collected by the at least one sensor and converting the fused data into the control instruction, thereby achieving the objective of controlling the driverless vehicle.

Figure 3A:
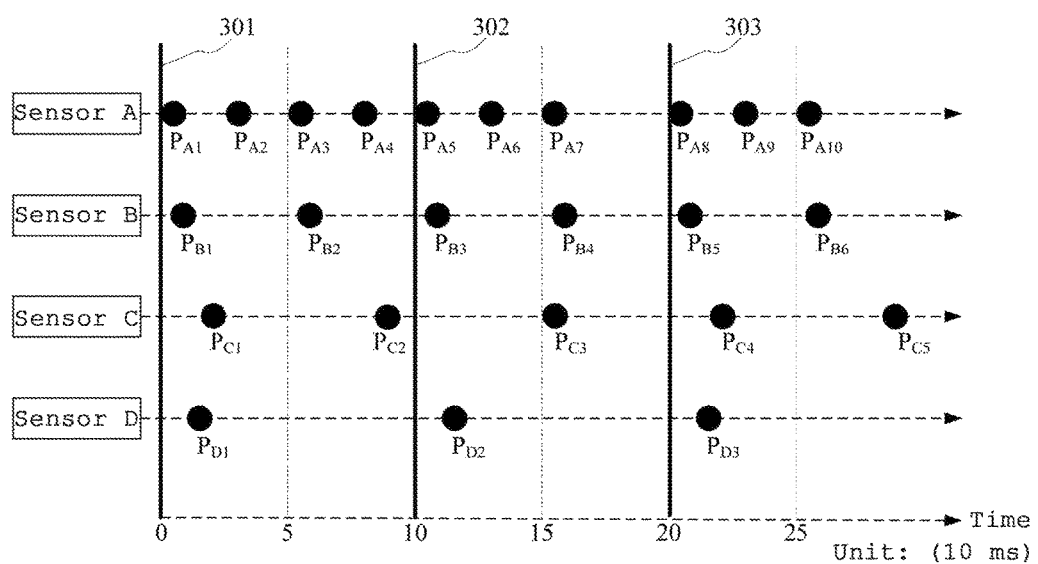
FIG. 3a to FIG. 3c are schematic diagrams of an application scenario of the data acquisition method for a driverless vehicle according to the present application.
Figure 3B:
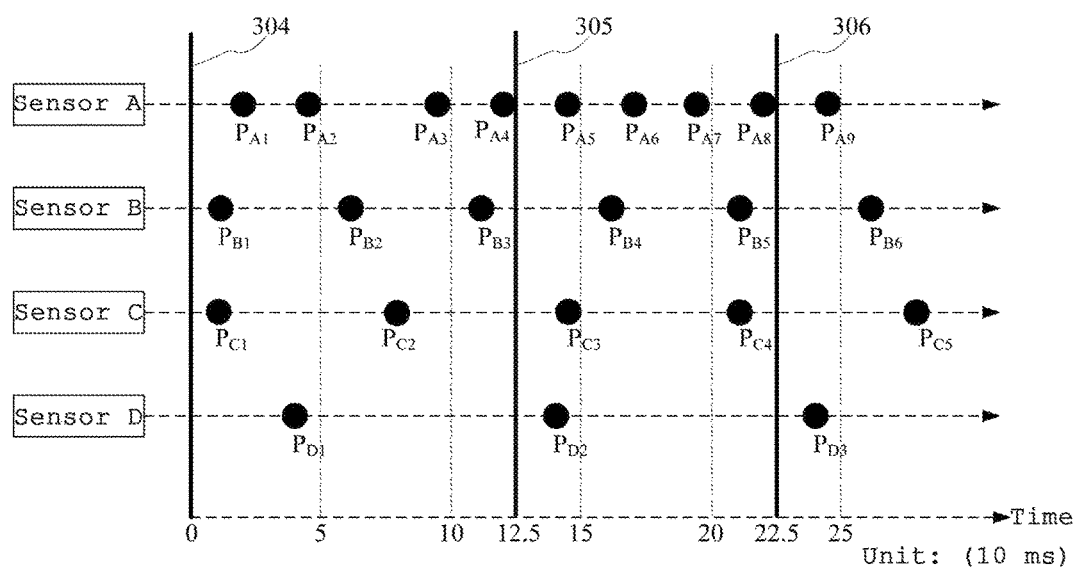
Figure 3C:
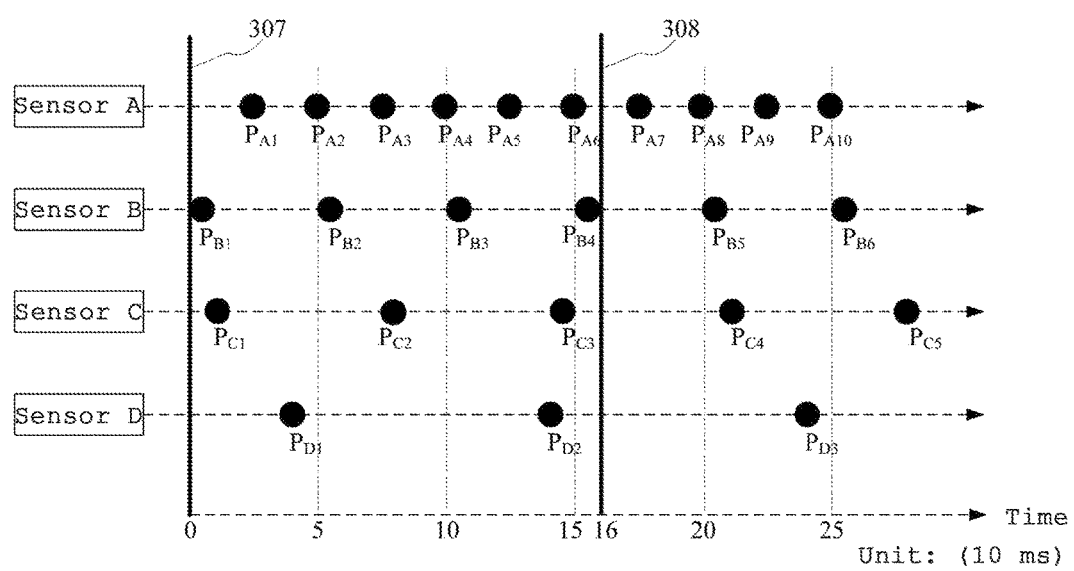

Further referring to FIG. 3a to FIG. 3c, FIG. 3a to FIG. 3c show schematic diagrams of an application scenario of the data acquisition method for a driverless vehicle according to the present application. In the application scenario shown in FIG. 3a to FIG. 3c, four sensors are provided in total, namely a sensor A, a sensor B, a sensor C, and a sensor D, and the sensor information of the four sensors is shown in Table 1.

TABLE 1

| Sensor name | Importance level | Collection period | Number of data packets required to be collected per collection period |
|---|---|---|---|
| Sensor A | 5 | 100 ms | 4 |
| Sensor B | 4 | 200 ms | 4 |
| Sensor C | 4 | 200 ms | 3 |
| Sensor D | 1 | 100 ms | 1 |

From Table 1, it can be determined that the sensor A has the highest importance level, so that the sensor A is taken as the first sensor, and the importance levels of the sensor B and the sensor C are immediately following the importance level of the sensor A, and thus the sensor B and the sensor C together form a second sensor set.

In FIG. 3a to FIG. 3c, the horizontal axis represents time, the vertical axis represents different sensors, black dots represent the data packets collected by different sensors at corresponding time points, wherein $P_{A1}$ represents the first data packet collected by the sensor A, $P_{A2}$ represents the second data packet collected by the sensor A, . . . , and $P_{A10}$ represents the tenth data packet collected by the sensor A; $P_{B1}$ represents the first data packet collected by the sensor B, $P_{B2}$ represents the second data packet collected by the sensor B, . . . , and $P_{B6}$ represents the sixth data packet collected by the sensor B; $P_{C1}$ represents the first data packet collected by the sensor C, $P_{C2}$ represents the second data packet collected by the sensor C, . . . , and $P_{C5}$ represents the fifth data packet collected by the sensor C; $P_{D1}$ represents the first data packet collected by the sensor D, $P_{D2}$ represents the second data packet collected by the sensor D, . . . , and $P_{D3}$ represents the third data packet collected by the sensor D.

FIG. 3a shows a schematic diagram of data processing steps performed in the event that the condition "the collection period of the first sensor has elapsed from the start time of the current time window to the current time" in the condition group has been met. In FIG. 3a, because the collection period of the first sensor (that is, the sensor A) is 100 ms, despite of how many data packets are collected by each sensor, as long as the collection period of the first sensor (that is, 100 ms) has elapsed from the start time of the current time window to the current time, the current time is used as the start time of the current time window for ending the previous time window and entering the next time window. As shown in FIG. 3a, the start time of the first time window is 0 ms (a time point indicated by a straight line shown by an icon 301 in FIG. 3a), and the end time is 100 ms obtained by adding the collection period of the first sensor (i.e., 100 ms) to the start time (a time point indicated by a straight line shown by an icon 302 in FIG. 3a); between the start time 0 ms of the first time window and the end time 100 ms of the first time window, the control device has acquired and stored in real time four data packets $P_{A1}$, $P_{A2}$, $P_{A3}$, and $P_{A4}$ collected by the sensor A, two data packets $P_{B1}$ and $P_{B2}$ collected by the sensor B, two data packets $P_{C1}$ and $P_{C2}$ collected by the sensor C, and one data packet $P_{D1}$ collected by the sensor D, and at this time, the condition "the collection period of the first sensor has elapsed from the start time of the current time window to the current time" in the condition group has been met. Therefore, the control device sets the start time of the current window to the current time 100 ms, thereby entering the second time window. The start time of the second time window is 100 ms (the time point indicated by the straight line shown by the icon 302 in FIG. 3a), the end time is 200 ms (a time point indicated by a straight line shown by an icon 303 in FIG. 3a) obtained by adding the collection period of the first sensor (i.e., 100 ms) to the start time; between the start time 100 ms of the second time window and the end time 200 ms of the second time window, the control device has acquired and stored in real time three data packets $P_{A5}$, $P_{A6}$, and $P_{A7}$ collected by the sensor A, two data packets $P_{B3}$ and $P_{B4}$ collected by the sensor B, one data packet $P_{C3}$ collected by the sensor C, and one data packet $P_{D2}$ collected by the sensor D, and at this time, the condition "the collection period of the first sensor has elapsed from the start time of the current time window to the current time" in the condition group has been met. Therefore, the control device sets the start time of the current window to the current time 200 ms, thereby entering the third time window. The start time of the third time window is 200 ms (the time point indicated by the straight line shown by the icon 303 in FIG. 3a), and the end time is 300 ms obtained by adding the collection period of the first sensor (i.e., 100 ms) to the start time, . . . , and so it goes on. Through the above-mentioned data processing steps, the control device realizes the aligned storage of the data packets collected by the at least one sensor.

FIG. 3b shows a schematic diagram of data processing steps performed in the event that the condition "the number of the acquired and stored data packets collected by the first sensor has reached the number of data packets required to be collected per collection period of the first sensor" in the condition group has been met. As can be seen from Table 1, the number of data packets required to be collected per collection period of the first sensor (that is, the sensor A) is 4, and therefore, no matter how long time passes, the next time window starts only if the number of the acquired and stored data packets collected by the sensor A after the start time of the current time window reaches 4. As shown in FIG. 3b, the start time of the first time window is 0 ms (a time point indicated by a straight line shown by an icon 304 in FIG. 3b), and when the number of the acquired and stored data packets collected by the sensor A after the start time of the first time window reaches 4 (a time point 125 ms indicated by a straight line shown by an icon 305 in FIG. 3b), the first time window ends, and the second time window starts. Between the start time of the first time window (the time point 0 ms indicated by the straight line shown by the icon 304 in FIG. 3b) and the end time of the first time window (the time point 125 ms indicated by the straight line shown by the icon 305 in FIG. 3b), the control device has acquired and stored in real time four data packets $P_{A1}$, $P_{A2}$, $P_{A3}$, and $P_{A4}$ collected by the sensor A, three data packets $P_{B1}$, $P_{B2}$, and $P_{B3}$ collected by the sensor B, two data packets $P_{C1}$ and $P_{C2}$ collected by the sensor C, and one data packet $P_{D1}$ collected by the sensor D, and at this time, the condition "the number of the acquired and stored data packets collected by the first sensor has reached the number of data packets required to be collected per collection period of the first sensor" in the condition group has been met. Therefore, the control device sets the start time of the current window to the current time 125 ms, thereby entering the second time window. The start time of the second time window is the end time 125 ms of the first time window (the time point indicated by the straight line shown by the icon 305 in FIG. 3b). When the number of the acquired and stored data packets collected by the sensor A after the start time of the second time window (i.e., 125 ms) reaches 4 (a time point 225 ms indicated by a straight line shown by an icon 306 in FIG. 3b), the third time window starts. Between the start time of the second time window (i.e., 125 ms) and the end time of the second time window (i.e., 225 ms), the control device has acquired and stored in real time four data packets $P_{A5}$, $P_{A6}$, $P_{A7}$, and $P_{A8}$ collected by the sensor A, two data packets $P_{B4}$ and $P_{B5}$ collected by the sensor B, two data packets $P_{C3}$ and $P_{C4}$ collected by the sensor C, and one data packet $P_{D2}$ collected by the sensor D, and at this time, the condition "the number of the acquired and stored data packets collected by the first sensor has reached the number of data packets required to be collected per collection period of the first sensor" in the condition group has been met. Therefore, the control device sets the start time of the current window to the current time 225 ms (the time point 225 ms indicated by the straight line shown by the icon 306 in FIG. 3b), thereby entering the third time window. The start time of the third time window is the end time 225 ms of the second time window, . . . , and so it goes on. Through the above-mentioned data processing steps, the control device realizes the aligned storage of the data packets collected by the at least one sensor.

FIG. 3c shows a schematic diagram of data processing steps performed in the event that the condition "the number of the acquired and stored data packets collected by each sensor in the second sensor set has reached the number of data packets required to be collected per collection period of the sensor" in the condition group has been met. In FIG. 3c, the number of data packets required to be collected per collection period of the sensor B in the second sensor set is 4, and the number of data packets required to be collected per collection period of the sensor C in the second sensor set is 3, and therefore, no matter how long time passes, only if the number of the acquired and stored data packets collected by the sensor B after the start time of the current time window reaches 4, and the number of the acquired and stored data packets collected by the sensor C after the start time of the current time window reaches 3, the current time is used as the start time of the current time window for ending the previous time window and entering the next time window. As shown in FIG. 3c, the start time of the first time window is 0 ms (a time point indicated by a straight line shown by an icon 307 in FIG. 3c), and when the number of the acquired and stored data packets collected by the sensor B after the start time of the first time window reaches 4 and the number of the acquired and stored data packets collected by the sensor C after the start time of the first time window reaches 3 (a time point 160 ms indicated by a straight line shown by an icon 308 in FIG. 3c), the first time window ends, and the second time window starts. Between the start time 0 ms of the first time window (the time point indicated by the straight line shown by the icon 307 in FIG. 3c) and the end time 160 ms of the first time window (the time point indicated by the straight line shown by the icon 308 in FIG. 3c), the control device has acquired and stored in real time six data packets $P_{A1}$, $P_{A2}$, $P_{A3}$, $P_{A4}$, $P_{A5}$, and $P_{A6}$ collected by the sensor A, four data packets $P_{B1}$, $P_{B2}$, $P_{B3}$, and $P_{B4}$ collected by the sensor B, three data packets $P_{C1}$, $P_{C2}$ and $P_{C3}$ collected by the sensor C, and two data packets $P_{D1}$ and $P_{D2}$ collected by the sensor D, and at this time, the condition "the number of the acquired and stored data packets collected by each sensor in the second sensor set has reached the number of data packets required to be collected per collection period of the sensor" in the condition group has been met. Therefore, the control device sets the start time of the current window as the current time 165 ms, thereby entering the second time window, and sets the start time of the second time window to the end time 165 ms of the first time window, . . . , and so it goes on with conducting the real-time acquiring and storing operations on the data packets collected by the at least one sensor. Through the above-mentioned real-time acquiring and storing operations, the aligned storage of the data packets collected by the at least one sensor is realized.

The method provided by the above-mentioned embodiment of the present application, by determining a first sensor and a second sensor set in at least one sensor of a driverless vehicle, then acquiring a start time of a current time window, and executing the following data processing steps: executing real-time acquiring and storing operations on data packets collected by each sensor in the at least one sensor after the start time of the current time window; determining whether any condition in a condition group is met; and after determining that the any condition in the following condition group is met, setting the start time of the current time window to the current time, and continuing executing the data processing steps, realizes the aligned storage of the data packets collected by the at least one sensor of the driverless vehicle.

Figure 4:
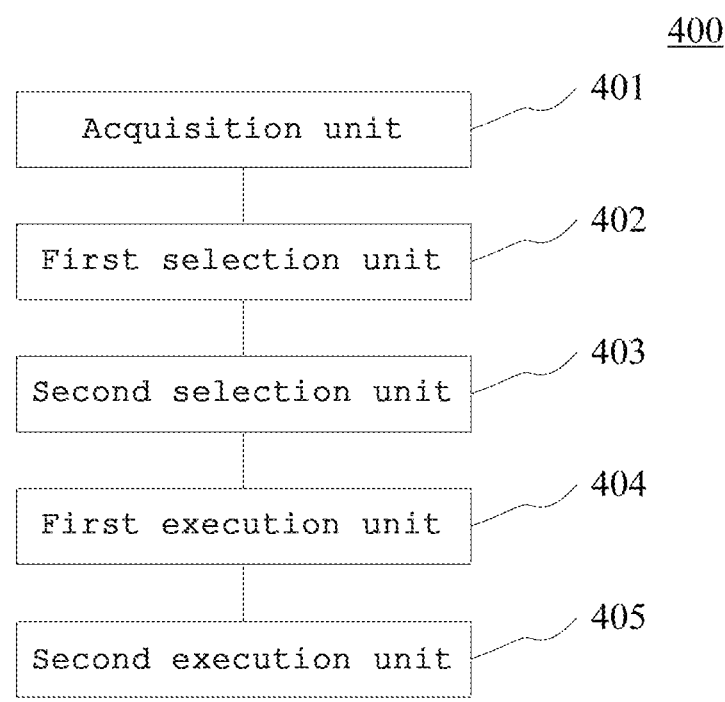
FIG. 4 is a schematic structural diagram of an embodiment of a data acquisition apparatus for a driverless vehicle according to the present application.

Further referring to FIG. 4, as an implementation of the methods shown in the above-mentioned figures, the present application provides an embodiment for a data acquisition apparatus for a driverless vehicle. The apparatus embodiment corresponds to the method embodiment shown in FIG. 2. The apparatus may be specifically applied to a variety of electronic devices.

As shown in FIG. 4, the data acquisition apparatus 400 for a driverless vehicle in this embodiment comprises: an acquisition unit 401, a first selection unit 402, a second selection unit 403, a first execution unit 404, and a second execution unit 405. The acquisition unit 401 is configured to acquire sensor information from each sensor among at least one sensor of the driverless vehicle, the sensor information comprising: an importance level, a collection period, and the number of data packets required to be collected per collection period; the first selection unit 402 is configured to select a sensor having the highest importance level among the at least one sensor of the driverless vehicle as a first sensor; the second selection unit 403 is configured to select at least one sensor not comprising the first sensor from the at least one sensor based on the importance level of the sensor to form a second sensor set; the first execution unit 404 is configured to acquire a start time of a current time window, and execute the following data processing steps: executing real-time acquiring and storing operations on data packets collected by each sensor in the at least one sensor after the start time of the current time window; and determining whether any condition in the following condition group is met: a collection period of the first sensor has elapsed from the start time of the current time window to a current time; the number of the acquired and stored data packets collected by the first sensor has reached the number of data packets required to be collected per collection period of the first sensor, and the number of the acquired and stored data packets collected by each sensor in the second sensor set has reached the number of data packets required to be collected per collection period of the sensor; and the second execution unit 405 is configured to, in response to the determination that any condition in the condition group is met, set the start time of the current time window to the current time, and continue executing the data processing steps.

In this embodiment, the concrete processes of the acquisition unit 401, the first selection unit 402, the second selection unit 403, the first execution unit 404, and the second execution unit 405 of the data acquisition apparatus 400 for a driverless vehicle and the technical effects they bring may refer to the relevant illustrations in Step 201, Step 202, Step 203, Step 204 to Step 206, and Step 207 in the corresponding embodiments of FIG. 2, and will not be repeated herein.

In some optional implementations of this embodiment, the first execution unit 404 may be further configured to: acquire the data packets collected by each sensor in the at least one sensor after the start time of the current time window and store the acquired data packets into a cache indicated by a cache address corresponding to the current time window in real time; and the second execution unit 405 may be further configured to: set a corresponding cache address for the current time window.

In some optional implementations of this embodiment, the second selection unit 403 may be further configured to: rank the at least one sensor based on the importance level, and select a predetermined number of sensors other than the first sensor from the at least one sensor according to an order from high to low of importance levels to form the second sensor set.

In some optional implementations of this embodiment, the data packets may be data packets with time stamps.

In some optional implementations of this embodiment, the importance level of the sensor may be preset based on the type of the sensor and the position information of the sensor in the driverless vehicle.

Figure 5:
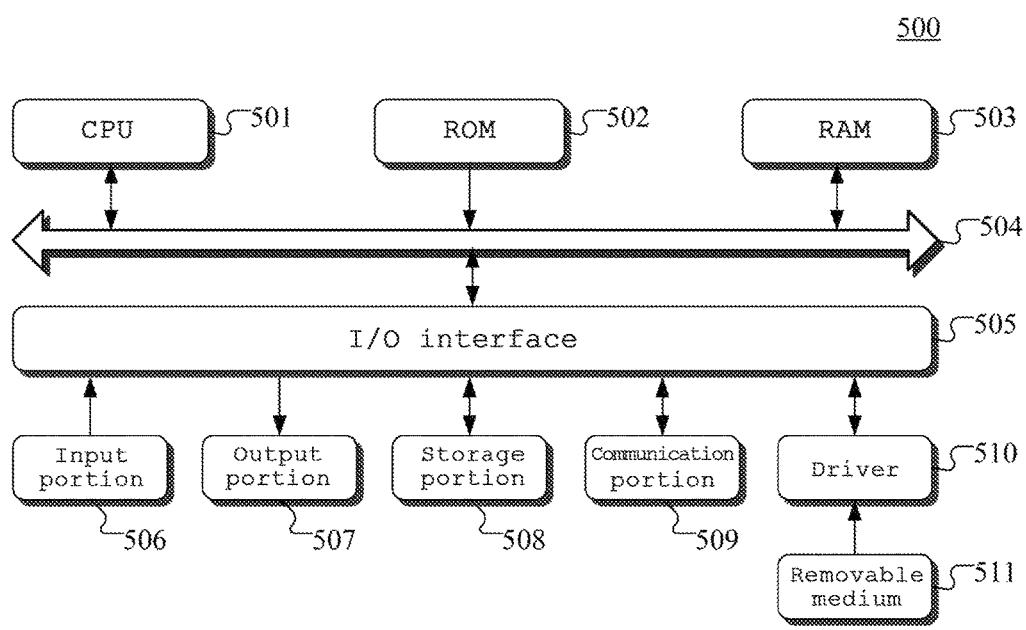
FIG. 5 is a schematic structural diagram of a computer system adapted to implement a control device of the embodiments of the present application.

Referring to FIG. 5, a schematic structural diagram of a computer system 500 adapted to implement a control device of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a sensor, an ECU (Electronic Control Unit), etc.; an output portion 507 comprising a sensor, an ECU, etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow charts may be implemented in a computer software program. For example, an embodiment of the present disclosure includes a computer program product, which comprises a computer program that is tangibly embedded in a machine-readable medium. The computer program comprises program codes for executing the method of the flow charts. In such an embodiment, the computer program may be downloaded and installed from a network via the communication portion 509, and/or may be installed from the removable media 511.

The flow charts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a first acquisition unit, a second acquisition unit, a first execution unit and a second execution unit, where the names of these units or modules are not considered as a limitation to the units or modules. For example, the acquisition unit may also be described as "a unit for acquiring sensor information."

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The one or more programs, when executed by a device, cause the device to: acquire sensor information from each sensor among at least one sensor of the driverless vehicle, the sensor information comprising: an importance level, a collection period, and a number of data packets required to be collected per collection period; select a sensor having a highest importance level among the at least one sensor as a first sensor; select at least one sensor other than the first sensor from the at least one sensor based on the importance level of the sensor to form a second sensor set; acquire a start time of a current time window, and executing following data processing steps: executing real-time acquiring and storing operations on data packets collected by each sensor in the at least one sensor after the start time of the current time window; determining whether any condition in a following condition group is met: a collection period of the first sensor has elapsed from the start time of the current time window to a current time; a number of acquired and stored data packets collected by the first sensor has reached the number of data packets required to be collected per collection period of the first sensor, and a number of the acquired and stored data packets collected by each sensor in the second sensor set has reached the number of data packets required to be collected per collection period of the sensor; and set the start time of the current time window to the current time in response to determining that any condition in the condition group is met, and continuing executing the data processing steps.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A data acquisition method for a driverless vehicle, comprising:
    acquiring sensor information from each sensor among at least one sensor of the driverless vehicle, the sensor information comprising: an importance level, a collection period, and a number of data packets required to be collected per collection period;
    selecting a sensor having a highest importance level among the at least one sensor as a first sensor;
    selecting at least one sensor other than the first sensor from the at least one sensor based on the importance level of the sensor to form a second sensor set;
    acquiring a start time of a current time window, and executing following data processing steps: executing real-time acquiring and storing operations on data packets collected by each sensor among the at least one sensor after the start time of the current time window; determining whether any condition in a following condition group is met: a collection period of the first sensor has elapsed from the start time of the current time window to a current time; a number of acquired and stored data packets collected by the first sensor has reached the number of data packets required to be collected per collection period of the first sensor, and a number of the acquired and stored data packets collected by each sensor in the second sensor set has reached the number of data packets required to be collected per collection period of the sensor; and setting the start time of the current time window to the current time in response to determining that any condition in the condition group is met, and continuing executing the data processing steps.

2. The method according to claim 1, wherein the executing the real-time acquiring and storing operations on the data packets collected by each sensor in the at least one sensor after the start time of the current time window comprises:
    acquiring in real time the data packets collected by each sensor in the at least one sensor after the start time of the current time window and storing the acquired data packets into a cache indicated by a cache address corresponding to the current time window, and
    the method further comprises, after the setting the start time of the current time window as the current time:
setting a corresponding cache address for the current time window.

3. The method according to claim 1, wherein, the selecting the at least one sensor other than the first sensor from the at least one sensor based on the importance level of the sensor to form the second sensor set comprises:
    ranking the at least one sensor based on the importance level, and selecting a predetermined number of sensors other than the first sensor from the at least one sensor according to an order from high to low of importance levels to form a second sensor set.

4. The method according to claim 1, wherein, the data packets are data packets with time stamps.

5. The method according to claim 1, wherein, the importance level of the sensor is preset based on a type of the sensor and position information of the sensor in the driverless vehicle.

6. A data acquisition apparatus for a driverless vehicle, comprising:
    at least one processor, and memory storing non-transitory computer readable instructions that when executed by the at least one processor operate to:
    acquire sensor information from each sensor among at least one sensor of the driverless vehicle, the sensor information comprising: an importance level, a collection period, and a number of data packets required to be collected per collection period;
    select a sensor having a highest importance level among the at least one sensor as a first sensor;
    select at least one sensor other than the first sensor from the at least one sensor based on the importance level of the sensor to form a second sensor set;
    acquire a start time of a current time window and execute following data processing steps: executing real-time acquiring and storing operations on data packets collected by each sensor in the at least one sensor after the start time of the current time window; and determining whether any condition in a following condition group is met: a collection period of the first sensor has elapsed from the start time of the current time window to a current time; a number of acquired and stored data packets collected by the first sensor has reached the number of data packets required to be collected per collection period of the first sensor, and a number of the acquired and stored data packets collected by each sensor in the second sensor set has reached the number of data packets required to be collected per collection period of the sensor; and
    set the start time of the current time window to the current time in response to determining that any condition in the condition group is met, and continue executing the data processing steps.

7. The apparatus according to claim 6, wherein, the non-transitory computer readable instructions further operating to:
    acquire in real time the data packets collected by each sensor in the at least one sensor after the start time of the current time window and store the acquired data packets into a cache indicated by a cache address corresponding to the current time window; and
    set a corresponding cache address for the current time window.

8. The apparatus according to claim 6, wherein, the non-transitory computer readable instructions further operating to:
    rank the at least one sensor based on the importance level, and select a predetermined number of sensors other than the first sensor from the at least one sensor according to an order from high to low of importance levels to form a second sensor set.

9. The apparatus according to claim 6, wherein, the data packets are data packets with time stamps.

10. The apparatus according to claim 6, wherein, the importance level of the sensor is preset based on a type of the sensor and position information of the sensor in the driverless vehicle.

11. A non-transitory storage medium storing one or more programs, the one or more programs when executed by a device, causing the device to perform a data acquisition method for a driverless vehicle, the data acquisition method comprising:

acquiring sensor information from each sensor among at least one sensor of the driverless vehicle, the sensor information comprising: an importance level, a collection period, and a number of data packets required to be collected per collection period;

selecting a sensor having a highest importance level among the at least one sensor as a first sensor;

selecting at least one sensor other than the first sensor from the at least one sensor based on the importance level of the sensor to form a second sensor set;

acquiring a start time of a current time window, and executing following data processing steps: executing real-time acquiring and storing operations on data packets collected by each sensor among the at least one sensor after the start time of the current time window;

determining whether any condition in a following condition group is met: a collection period of the first sensor has elapsed from the start time of the current time window to a current time; a number of acquired and stored data packets collected by the first sensor has reached the number of data packets required to be collected per collection period of the first sensor, and a number of the acquired and stored data packets collected by each sensor in the second sensor set has reached the number of data packets required to be collected per collection period of the sensor; and setting the start time of the current time window to the current time in response to determining that any condition in the condition group is met, and continuing executing the data processing steps.

* * * * *